Patented Feb. 23, 1937

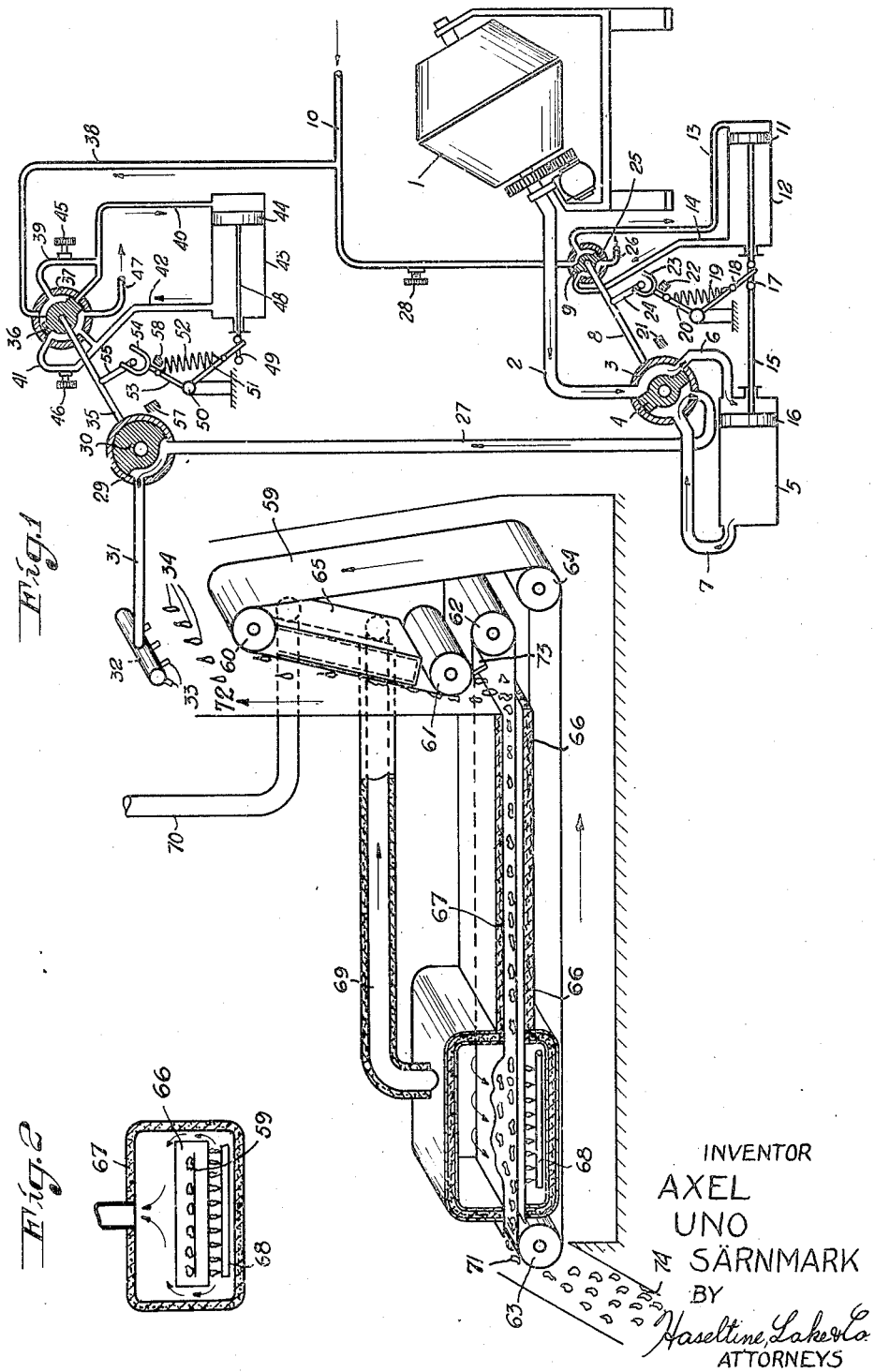

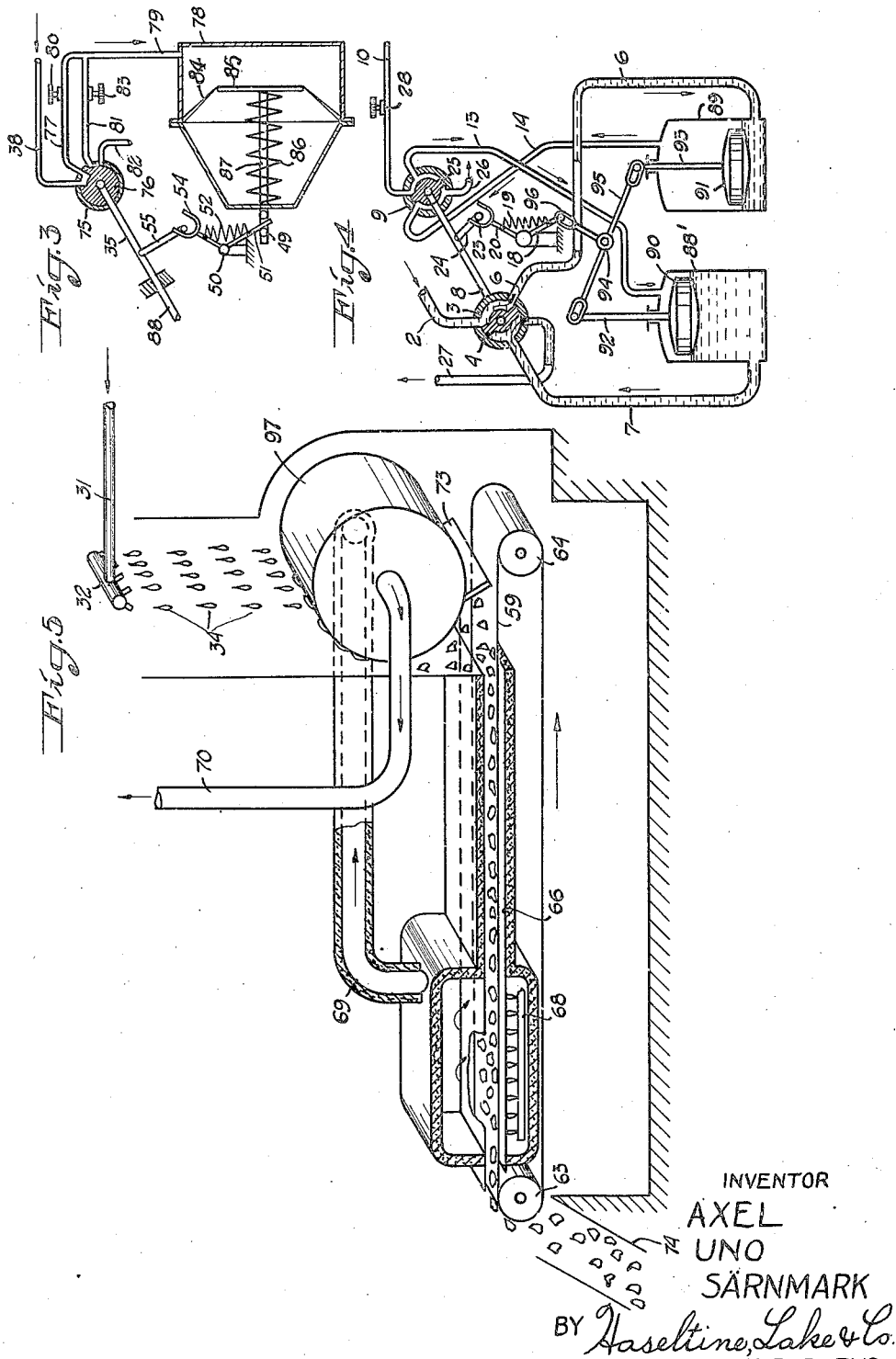

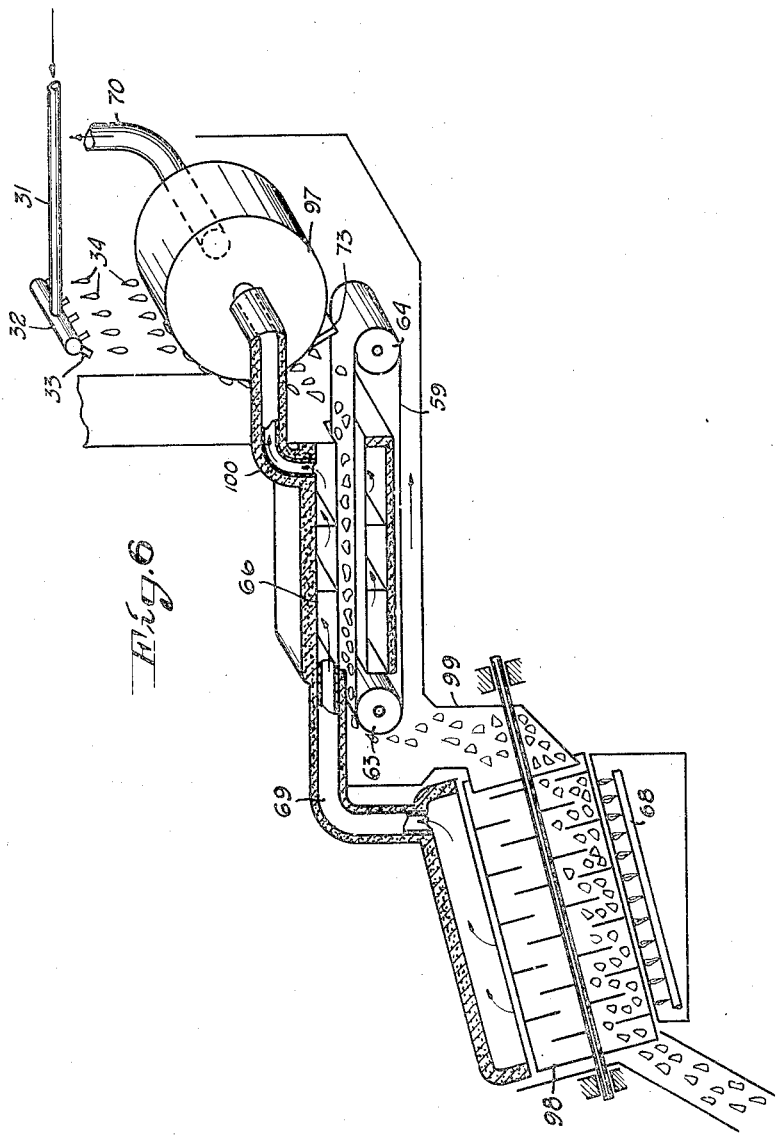

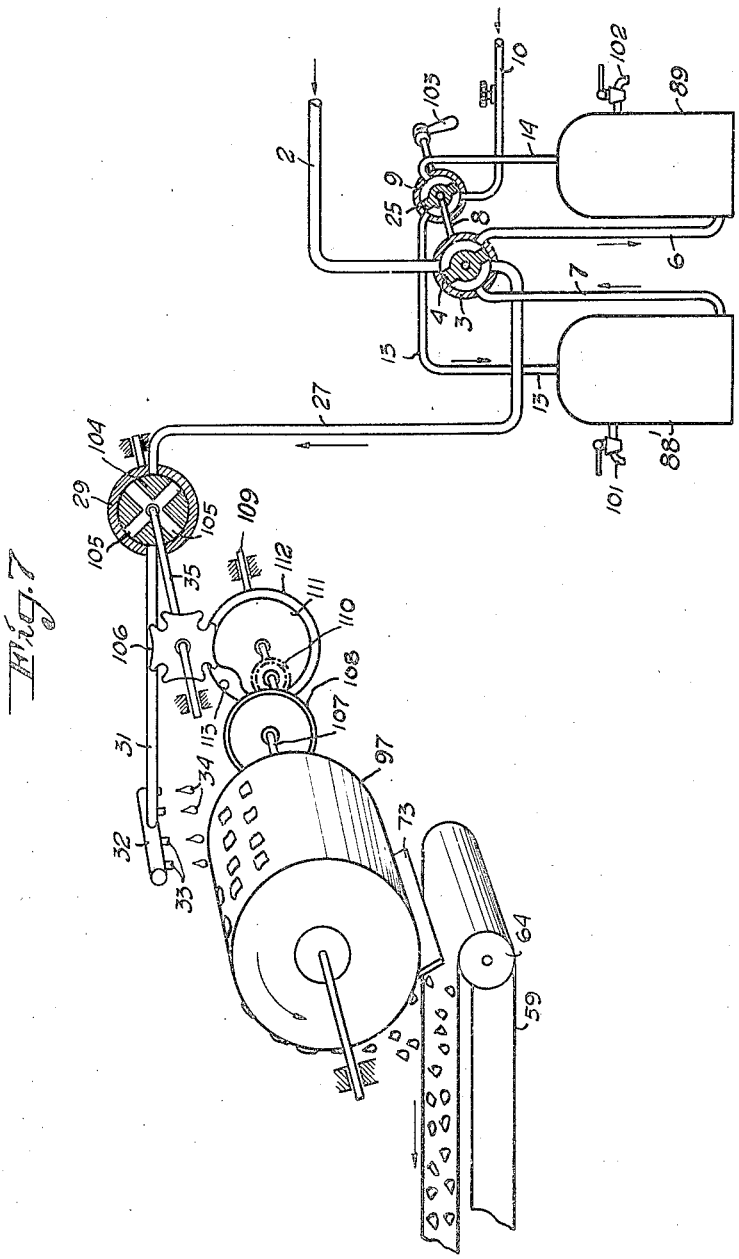

2,071,434

UNITED STATES PATENT OFFICE 2,071,434

METHOD AND MACHINE FOR PRODUCING FLAKES AND THE LIKE FROM PLASTIC MASSES

Axel Uno Särnmark, Gothenburg, Sweden

Application October 3, 1933, Serial No. 691,980
In Sweden October 3, 1932

13 Claims.  (Cl. 99—80)

The present invention refers to a method of continuous manufacture of arbitrary preparations, such as articles of food, luxuries, chemicals or the like in the form of flakes, cakes, tablets or the like. The invention is applicable, for example, for the production of breakfast and lunch dishes and sweets adapted to be distributed and sold in packages. The continuous mode of operation in the manufacturing process permits of an automatic manufacture, which may also be combined with semi-automatic or automatic packeting of the finished product.

Practically any substances may be used as raw material for the manufacturing process, said materials being, according to the circumstances, brought into such a consistency through suspension or dissolution or by suspension as well as dissolution, or by being softened in a suitable liquid, that the mass may be spread out directly over one or more surfaces in layers of a suitable thickness, or may be distributed, through one or more nozzles or other spreading means, in the form of drops, layers or other units of an arbitrary or desired size, cross-section or shape, said drops and so forth being caused when falling down either to coagulate or solidify in suitably heated air, gas, liquid or the like, or to hit one or more suitably heated stationary or movable surfaces.

If the mass is primarily to solidify on a stationary surface, the latter is heated to such an extent that the mass is brought into a sufficiently solid consistency through jellification, coagulation or evaporation or through two or more of these factors in cooperation. After the mass has solidified, it is preferable, as a rule, to continue the heating process until the mass is dry and, in many cases, until it has also become roasted. In order that the manufacture shall be continuous, it is preferable that the surface or surfaces on which the mass is spread out is endless and movable, so that the mass is spread in one place and is loosened or scraped off in another place on having solidified, either before or after it has also dried and become roasted, if desired. The movable surfaces may take various forms. For example, they may be in the form of bands or drying rollers, or, a combination of both of these means may come into use. A continuous production may also take place by the use of reciprocating plates. These are to be regarded as different embodiments for carrying the same method into effect.

The spreading of the mass on the surfaces may take place, as stated, either by the mass being evenly spread in layers of a suitable thickness, or by the same being distributed through various spreading means. In the first instance the spreading may be effected by the thin pulpy or liquid mass being brought into a suitably shaped container which is open at the top and in which the mass is kept at a constant level by controlling means known per se. The drying roller, if any, is arranged with its axis horizontally in such a position that the roller is caused to dip into the mass to a certain extent. The endless band is arranged in a similar manner, its one end roller being on a lower level than the other so as to permit of being arranged in such a position that the band is caused to dip into the mass to a certain extent when running over the roller. If the drying roller or the endless band is brought into movement, the mass will thus be entrained by the band, the mass being spread evenly over the surface of the band to a thickness determined, among other things, by the consistency of the mass and by the speed of the roller or band.

The drying roller is heated in known manner from the inside and/or from below, the band being heated from below in an analogous manner. For the obtention of a uniform product it is necessary that the heating is uniform, which may be provided for by means of steam, gas or electric heating. If roasting is to take place on the roller or band and steam is used as a heating agent, the latter should be superheated. With all three methods of heating it should be attended to that the temperature is highest in the zone where the film of the material treated leaves the surface. In order that this may take place uniformly and continuously, a scraper is provided at the point in question of the roller or band, said scraper scraping off the film and guiding the same to a conveyor or other device for its removal. Preferably, the scraping member should be shaped in such a manner as to subdivide the film into flakes of the desired size. The thickness of the flakes may be determined entirely by alterations in the speed or in the consistency of the mass.

Instead of effecting complete drying or roasting of the goods on the drying roller or band, the material under treatment may be scraped off as soon as it has become sufficiently solid, the drying or roasting process being effected afterwards by other means such as drying shelves, rotating drums, shake-roasting apparatus and so forth. The spreading of the mass may also be effected in such manner that the mass is pressed out uniformly, through one or more slotted nozzles, over the surfaces of the bands or rollers employed. If the spreading is to take place through distribution in spreading devices, such distribution may be effected by the liquid mass being sprayed, with or without pressure, through one or more nozzles or openings, over the movable surfaces, or by the mass being caused to drop down on such surfaces which take the form of bands, rollers or plates.

This method of manufacture is applicable to practically any articles of food, one type of which are vegetables, preferably such that are rich in starch, inulin or similar polysaccharides. The advantages of the novel method according to the invention are the following:

1. By the admixture of arbitrary ingredients, such as sugar, salt, spices, liquids, baking powder, baker's salt and so forth, the taste of the finished product and so on may be varied to the exact requirements of the consumers.

2. The starting material for the finished product may be varied as desired. For example, oat, rye, barley, corn and so forth, and any mixtures of these materials, may come into use.

3. By the admixture of differently colored articles of food or dye-stuffs, such as cocoa and others, the color of the final product may be varied as desired.

4. The method also permits of the production of suitable units of the finished product to answer the requirements of the consumers in regard to the size, shape and the general appearance of the product.

5. Finally, the method according to the invention facilitates, through the admixture of certain metal salts, such as magnesium and calcium salts and so forth, impartment of wholesome and prophylactic properties to the finished product.

In the accompanying drawings, Figs. 1–7 illustrate a few embodiments of the invention by way of diagrammatic representation.

Figure 1 is a general view, partly diagrammatic and partly in section, of an apparatus for carrying out the invention.

Figure 2 is a detail showing the roasting furnace in section.

Figure 3 is a detail of a modification of the device for controlling the size and time of dropping of the material units.

Figure 4 is a detail of a modification of the device for continuously forcing the liquid or plastic mass through the conduit leading from the meter.

Figure 5 shows an embodiment wherein the material units are received on the surface of a heated drum.

Figure 6 shows a further embodiment employing a rotating roasting drum.

Figure 7 shows a further embodiment employing automatic devices for controlling the flow of the liquid or plastic material.

In Fig. 1, which shows an arrangement for the distribution of the mass through a spreading device, 1 indicates a mixing machine for the liquid or plastic mass, out of which the flakes, cakes or tablets are to be produced. 2 is a conduit to convey the mass from the mixing machine, 3 is a switching device with a rotatable disk 4 provided therein, by means of which the mass may be guided to the one or the other side of a cylinder 5 through the conduits 6 or 7. The disk 4 is connected, through a shaft or the like 8, to a second switching or valve device 9 adapted to convey pressure gas—air, carbon dioxide or the like—coming from the conduit 10 to the one or the other side of the piston 11 in the cylinder 12, either through the conduit 13 or 14. In the position of the switching device 9 shown in the drawings, the pressure gas communicates through the conduit 10 with the conduit 13. The piston 11 is connected with the piston 16 in the cylinder 5 by means of a rod 15. The rod 15 is connected to a lever 18 by means of a fork device or the like 17. The lever 18 is connected to a second lever 20 by means of a spring 19, said lever 20 being movable between two abutments 21 and 22. The lever 20 may actuate a shaft 8 by means of a fork device or the like 23 through the medium of a lever 24, said shaft 8 being connected with the movable disk 4 of the switching device 3 as well as with a movable disk or the like 25 in the switching device 9, which latter is also provided with an outlet opening, pipe or the like 26. The switching device 3 is furthermore provided with an outlet or rising pipe 27 for the liquid or plastic mass. 28 designates a valve or throttle member for the pressure gas supplied to the switching device 9. The conduit 27 is further connected to a cut-off device or the like 29 including a rotatable member 30 for a periodic cut-off or admission of the mass through the conduit 31 to the spreading device 32, which is provided with one or more nozzles or the like 33, through which the mass may be forced out, or through which the same may penetrate, in the form of drops or other units 34. The member 30 is connected through a shaft 35 to a rotatable disk or the like 36 of a switching device 37. The switching device 37 is connected through the conduit 38 with the pressure gas conduit 10, and through the conduits 39—40 and 41—42 respectively with each end of the cylinder 43, in which a piston 44 is adapted to reciprocate. Inserted into the conduits 39 and 41 are two controllable valves, throttle members or the like 45 and 46. An outlet conduit 47 provided in the switching device 37 may be connected, by shifting of the rotatable disk, with the conduit 40 and with the conduit 42, as the case may be. The piston 44 is connected, through a rod 48 and a fork device 49, to a lever 51 pivoted about a centre 50. The lever 51 is connected by means of a spring 52 to a lever 53 pivoted about the said centre 50 or about some other adjacent centre, said lever 53 being adapted to actuate a lever 55 connected to the shaft 35, by means of a fork device 54. Furthermore, the lever 53 is movable between the abutments 57 and 58.

The machine elements described so far cooperate in the following manner: The mixing machine is filled with suitable raw material for the production of oat flakes, for example, the raw material consisting preferably of water, oat meal, salt, sugar, baker's salt, and a calcium and/or magnesium salt, if desired. If desired, some skim-milk and a little fat in the form of oil or the like may also be added. The mixing machine is brought into rotation by means of a motor or the like, the raw material being then mixed and entering the switching device 3 through the conduit 2 in the form of a liquid or plastic dough. At the position of the disk 4 shown in the drawings, the plastic mass may penetrate further through the switching device 3 and the conduit 6 to the one end of the cylinder 5. The conduit 10 is preferably connected to an air compressor or carbon dioxide tube, the pressure gas then penetrating from the latter through the throttle member 28 into the switching device 9. At the position of the member 25 shown in the drawings, the pressure gas passes further through the conduit 13 to the one end of the cylinder 12, the piston 11 then moving forwards and bringing the rod 15 and the piston 16 of the cylinder 5 with it. The liquid or plastic mass is thus sucked through the conduit 6, the cylinder 5 being filled with the said mass during the forward movement of the piston 16.

When the rod 15 moves forwardly, the lever 18 is entrained by the fork 17, the spring 19 being thus brought under tension. When the lever 18 has moved somewhat beyond the position in alignment with the lever 20, the spring 19 suddenly jerks the lever 20 from the abutment 22 and moves the arm to the abutment 21. The fork device 23 connected to the lever 20 then turns the lever 24 and the shaft 8 through a momentary action into another position, the disk 4 as well as the member 25 of the shifting devices 3 and 9 being then reversed. The pressure gas from the conduit 10 now flows through the conduit 14 into the cylinder 12 and returns the piston 11 into its original position, while the pressure gas previously introduced into the cylinder 12 leaves the cylinder through the conduit 13 and escapes through the outlet conduit 26. As before, the piston 11 brings the piston 16 along with it and forces the liquid or plastic mass in the cylinder 5 through the conduit 6 up through the conduit 27, fresh mass entering at the same time the cylinder 5 through the conduits 2 and 7. When the piston 11 returns into its first initial position, entraining the rod 15 and the lever 18 by means of the fork 17 as before, the lever 20 being jerked from the abutment 21 to the abutment 22 through the influence of the spring 19, the shaft and the disk 4 as well as the member 25 are returned into their initial positions through the fork 23 and the lever 24.

Then commences a new working period of the piston 11 in the cylinder 12, the liquid or plastic mass in the cylinder 5 being thus forced through the conduit 27. The speed of the piston 11 in the cylinder 12 may be regulated by throttling the valve or throttle member 28, more or less. The liquid or plastic mass forcing its way through the conduit 27 enters the switching device 29. At the adjustment of the member 30 shown in the drawings the mass can penetrate further through the conduit 31, the spreading or dividing device 32 and the nozzle 33, and leaves the latter in the form of drops 34. Inasmuch as the mass is to leave the nozzle 33 in the form of drops 34, the forward flow of the mass must be periodically interrupted. Such periodical interruption is effected by a periodic turning or movement of the member 30.

The periodical interruption is brought about in the following manner:

The pressure gas coming from the conduit 10 flows through the conduit 38 to the switching device 37 and penetrates, at the adjustment of the disk 36 shown in the drawings, through the conduit 39 and the throttle member 45 and the conduit 40 to the one end of the cylinder 43, the piston 44 then moving forwards and bringing the rod 48 along with it. In its movement the rod 48 also brings the lever 51 with it by means of a fork device 49, the spring 52 being thus brought under tension. When the lever 51 has moved somewhat beyond the position which is in alignment with the lever 53, the latter is suddenly jerked from the abutment 58, the lever 55 being thus turned by the fork 54 into another position while entraining the shaft 35 and the disks 30 and 36. The flow of the liquid or plastic mass is thus interrupted. The pressure gas forcing its way through the conduit 38 now flows, upon the adjustment of the disk 36, through the conduit 41, the throttle member 46 and the conduit 42 to the other end of the cylinder 43, the piston 44 being thus returned into its initial position while entraining the rod 48 and the levers 51 and 53. The pressure gas previously introduced into the cylinder escapes through the conduits 40 and 47 on the return movement of the piston 44. At the sudden return movement of the lever 53 into its initial position the disks 30 and 36 are quickly shifted, the mass then again being forced through the conduit 31 and the nozzles 33 in the form of drops 34, while the pressure gas is permitted to flow through the conduit 40 as before, thus again actuating the piston 44, so that the latter moves forwards, as before. The piston 44 will thus reciprocate, the timing of its movement being effected through the throttle member 45 and the timing of its return movement through the throttle member 46. The size of the drops 34 depends on the quantity of the mass flowing forth through the forward movement of the piston 44, and may thus be controlled by an adjustment of the throttle member 45. The drops are actually spurts of cereal mass which are so suddenly projected that their individual departure from the nozzles of the spreading or dividing device 32 occurs, being mainly caused by the momentum of said drops when the movement of the mass behind them within the nozzles and the dividing device is suddenly arrested. The delay between two consecutive dropping periods is equal to the time for the return movement of the piston 44, and may thus be controlled by adjustment of the throttle member 46.

In the remaining portion of the figure, 59 indicates a movable and flexible conveyor band consisting of stainless steel, for example, or of some other material. The band is stretched over the rollers 60, 61, 62, 63 and 64, which rollers are rotatable in bearings provided for the same. The band 59 may be moved over a heating plate 65, which in the drawings is shown to be rectangular, flat and hollow. After the band 59 has passed the heating plate it may be bent laterally between the rollers 61 and 62, as shown in the figure, whereupon the same runs through a long and narrow rectangular furnace 66, which is shown in cross section in Fig. 2. The furnace 66, which is insulated all over its length by an insulation 67, is heated in its remote end by means of a source of heat of any suitable kind, such as gas flames 68. The combustion gases from these flames flow about a portion of the furnace 66 and escape through the pipe 69 into the heating plate 65 and further into the atmosphere through the pipe 70. Since the long and narrow furnace must have an inlet and an outlet opening for the movable band 59, flow of air through the furnace is unavoidable. The arrangement of the construction is such, however, that the air enters the furnace at 71 and escapes therefrom at 72. A reversed direction of flow may also be provided for. Arranged between the rollers 61 and 62 is a scraper, knife or the like 73 bearing on the band. The machinery is surrounded by a protecting cap, preferably of sheet metal or the like, besides which this cap is combined at its remote end with a drum, a conveyor band or the like 74 to remove the finished product.

The arrangement operates in the following manner:

The liquid or plastic drops 34 penetrating through the spreading or dividing device 32 fall down on the portion of the band 59 sloping over the heating plate 65, said band being caused to move at a suitable speed by means of a motor or the like. The heating plate 65 will be heated by the hot combustion gases coming from the gas flames 68 and flowing through the pipe 69 and the hollow heating plate from which the gases escape through the pipe 70. By this means, the portion of the movable band 59 above the heating plate will also obtain a temperature corresponding to the heating of the heating plate. This temperature may be regulated by conducting a portion only of the waste gases from the pipe 69 through the heating plate 65. When the drops 34 fall down on the band, they will be flattened so as to flow out somewhat in the longitudinal direction, whereupon they will quickly solidify, through jellification, coagulation or evaporation, into the form of flakes, cakes or the like. When the flakes solidified on the band reach the roller 61 through the movement of the band, they will be scraped off by the knife 70 and again fall vertically down on the movable band 59. The flakes are now lying loose on the band and enter the one end of the furnace 66, in order to be dried during the further transport through the furnace, to be finally roasted at the remote warmer portion of the furnace. When during the movement of the band the flakes have been conveyed to the roller 63, they will be showered down through the conveyor drum 74 or onto a conveyor band that may be provided in place of said drum.

The falling drops are thus subjected to three different processes in the machine:
1. Solidification on the band over the heating plate 65.
2. Drying in the one end of the elongated furnace.
3. Roasting at the remote end of the furnace.

As stated before, the size of the drops 34 is controllable by means of the throttle member 45 and the time between each dropping period by means of the throttle member 46. The speed of the band and the temperatures of the heating plate 65 and the furnace 66 are regulated so that a suitable solidification will take place over the heating plate and a suitable drying and roasting process in the furnace. The time between each dropping period is then regulated so as to correspond to the speed of the band 59.

The size of the drops 34 not only depends on the time of flow of the liquid or plastic mass through the nozzles 33, but also depends on the pressure in the conduit 27. Again, the pressure in this conduit depends on the speed of reciprocation of the piston 11 and may be controlled by means of the throttle member 28.

Fig. 3 shows a further device for the control of the size of the drops 34 and of the time between the different dropping periods. Fig. 4 shows a further arrangement for continuous forcing of the liquid or plastic mass through the conduit 2 from the open mixing machine 1.

In Fig. 3, 38 designates a pressure gas conduit as before. 75 denotes a switching device and 76 a rotatable piston, disk or the like in the same. 77 indicates a conduit for supply gas conducted to the diaphragm casing 78 through a conduit 79, said supply gas being controlled by the throttle member 80. 81 is a conduit for exhaust gas escaping from the diaphragm casing 78 through the conduit 82, which exhaust gas may be controlled by the throttle member 83.

The diaphragm casing 78 is provided with an elastic diaphragm 84 made from rubber, for instance, or the like and provided with a more rigid plate 85 in its centre, said diaphragm being actuated in the one direction by a spring 86. The plate 85 is connected at the centre with a rod 87 corresponding to the rod 48 described with reference to Fig. 1. The other details of Fig. 3 are designated by reference numerals corresponding to those used for similar details in Fig. 1. Thus the switching device 29 with the member 30 is connected to that end of the shaft 35 which is denoted by 88.

The arrangement operates in the following manner:

The pressure gas enters through the conduit 38, and in the position of the piston or disk 76 shown in Fig. 3 the gas flows through the conduits 77 and 79 to the diaphragm casing 78, the diaphragm 84 and the plate 85 then moving forwards and entraining the rod 87, so that the spring 86 is compressed at the same time. The rod 87 as before locks the lever 55 and the shaft 35, through the fork 49 and the spring 52, in the second position and shifts the member 76 as well as the member 30 connected as at 88. The conduit 79 will then be directly connected to the outlet conduit 82 through the member 76 and the throttle member 83, the pressure gas being cut off at the same time. The spring 87 which is under tension then returns the diaphragm 85 into its initial position, while the air escaping through the conduits 79 and 81 can be throttled more or less by the throttle member 83. The rod 87 is then returned into its initial position and, as before, brings the fork 49, the lever 51, the lever 55 and the shaft 35 along with it. The diaphragm will thus reciprocate together with the rod 87 and the fork 49 as before, whereupon the time for the forward movement of the diaphragm can be controlled by the throttle member 80 corresponding to the actual dropping time, while the time for the return movement of the diaphragm corresponding to the time between the dropping periods can be controlled by the throttle member 83.

In Fig. 4, 88' and 89 indicate two different pressure vessels with floats 90 and 91 movable up and down therein. These floats are connected through rods or the like 92 and 93 to a lever 95 pivoted about a centre 94 and connected with a lever 96. Other details of Fig. 4 that have complete equivalents in Fig. 1 are designated by the same reference numerals as in Fig. 1.

The arrangement operates in the following manner:

In the position of the members or disks 4 and 25 shown in Fig. 4, the gas from the pressure gas conduit 10 will flow through the throttle member 28 and the conduit 13, the gas then entering the container 88, besides which the liquid or plastic mass in the container is brought under pressure, so that it will be forced up through the conduit 7 and the rising conduit 27. According as the mass in the container 88 is consumed, the float 90 sinks and entrains the rod 92 and the lever 95, mass from the conduit 2 being at the same time supplied through the conduit 6 to the lower part of the container 89, so that the level of the mass in the same is caused to rise and to raise the float 91 together with the rod 93 connected thereto, said rod being also connected to the lever 95. When the float 90 has sunk into its lowermost position and the float 91 has risen to its uppermost position, the lever 95 has actuated the lever 18 and the spring 19 through the rods 92 and 93, in such a manner that the lever 20 will suddenly shift the lever 24 and the shaft 8 together with the members 4 and 9. The pressure gas then penetrates from the conduit 10 through the conduit 14 into the container 89, the mass being forced up through the conduits 6 and 27, and fresh mass being supplied to the lower part of the container 88 through the conduits 2 and 7. The containers 88 and 89 will thus be under pressure alternately, an equalization of pressure from the container which is not under pressure being then effected through pipes 26 to the atmosphere. A continuous flow of the liquid mass will take place through the conduit 27, as before, the speed and the pressure of the flowing mass being controlled by the throttle member 28.

In Fig. 5, 31 indicates a conduit for periodic supply of a liquid or plastic mass, 32 is a spreading device and 33 are different spreading nozzles, and 34 designates drops or the like coming from the nozzles 33. 97 indicates a rotating heated drum, onto which the drops 34 fall down and solidify. Here, the band 59 runs over the rollers 63 and 64. Otherwise, such details that have their full equivalents in Fig. 1 are provided with the same reference numerals as in Fig. 1.

The arrangement operates in the following manner:

The band 59 and the drum 97 move or rotate at a suitable speed adapted for the purpose. The gases escaping from the burner 68 flow about the furnace 66 and escape through the pipe 69, after which they enter the one end of the cylinder and escape at the other end through the outlet pipe 70. A certain temperature is imparted to the cylinder, which temperature may be controlled by the admission of a greater or smaller portion of the combustion gases. The falling drops 34 hit the drum 97 somewhat toward the side, whereby the drops will be flattened and somewhat extended longitudinally, whereupon they solidify in the form of flakes, cakes or the like by reason of the temperature of the drum 97. The solidified flakes are then scraped off by the knife 73 on the continued rotation of the drum, after which they fall down as loose flakes upon the movable conveyor band 59. The flakes then follow with the conveyor band 59 into the furnace 66 where they will dry, to begin with, whereupon they are also roasted, if desired, in the warmer part of the furnace. The finished flakes leave the band at the roller 69 and fall down through the conveyor drum 74, which may also be replaced by a conveyor band or the like. The speed and the temperature of the band or drum respectively are regulated relatively to each other and with respect to the time between the consecutive dropping periods.

Fig. 6 shows a further embodiment of the invention, where 98 indicates a rotating roasting drum, 99 a collecting channel for dried but non-roasted flakes, and 100 a pipe for hot gases escaping from the drying furnace 66. Otherwise, such details that have their full equivalents in Fig. 1 are provided with the same reference numerals as in Fig. 1.

The arrangement operates in the following manner:

The band 59 and the drum 97 or 98 respectively rotate at speeds corresponding to the time of drying, solidification and roasting. The combustion gases from the burner 68 which flow about the roasting drum 98 escape through the pipe 69 to the furnace 66, where they pass about the same, after which they escape through the passage 100 to the one end of the drum 97, in order finally to leave the other end of the drum through the outlet passage 70. The temperature in the roasting drum is regulated through the burner 68 and the temperature in the furnace 66 and in the drum 97 by leading a greater or smaller quantity of the combustion gases through the furnace 66 and the drum 97 respectively. The falling drops 34 hit the rotating drum 97 either straight from above or somewhat toward the side. They are thus caused to flow out and will be somewhat extended longitudinally, whereupon they solidify on account of the temperature of the drum. The solidified flakes are then scraped off by the knife 73 on the continued rotation of the drum, the flakes then falling down as loose flakes upon the band 59, whereupon they are introduced by the band into the furnace 66 where they are dried. The dried flakes leave the band at the roller 63, after which they enter the roasting drum 98 through the medium of the collecting channel 99. Preferably, the roasting drum may be provided on the inside with a helically shaped plate, by means of which the flakes are being fed forwards during the rotation of the drum. After the flakes have been roasted they leave the drum and enter the conveyor drum 74, which may also be replaced by conveyor bands, whereupon the flakes pass directly to the packeting machine.

Fig. 7 shows a further embodiment of the invention where the periodic interruption in the flow of the mass advancing through the spreading devices is effected by the rotating drum, the movable band or a special motor. The forcing of the mass through the conduits and the spreading devices is effected by means of pressure gas coming, for instance, from an air compressor or from a carbon dioxide cylinder, with the aid of two pressure vessels, but here the switching of the mass and the pressure gas respectively from the one pressure vessel to the other is effected manually. Such machine elements in Fig. 7 that have direct equivalents in the previous drawings are indicated by the same reference numerals. The other machine elements have been given new reference numerals. 101 and 102 thus indicate two emptying cocks for compressed air, and 103 is a switching handle. 104 denotes a rotary disk, piston or the like with passage openings 105. The piston or the like 104 is connected with the shaft 35, on which a combined stop and tooth member 106 is secured. Mounted on the shaft 107 of the drum 97 is a pinion or the like 108 cooperating with a gear wheel 110 mounted on the shaft 109. Furthermore, the shaft 109 has mounted thereon a disk 111 cooperating with the member 106, said disk being connected through the disk 112 with a tooth device or the like 113.

The arrangement operates in the following manner:

The liquid or plastic mass enters the switching device 3 through the conduit 2, and pressure gas is introduced into the shifting device 9 through the conduit 10 and the throttle member 28. In the position of the switching member or disk 4 shown in the figure, the liquid or plastic mass passes from the conduit 2 through the shifting device 3 and the conduit 6 to the pressure vessel 89, the mass being thus caused to rise in the latter, while the air in the vessel is expelled through the valve 102. When the mass has ascended to this valve and has commenced to flow out through the same, the valve 102 is closed, further supply of mass being then prevented by the air cushion formed above the mass. The members 4 and 25 are then shifted by means of the handle 103, the mass in the conduit 2 being then permitted to flow into the pressure vessel 88' through the shifting device 3 and the conduit 7. When this has also been filled, the valve 101 is closed. Upon the new adjustment of the members 4 and 25, the pressure gas can flow into the pressure vessel 89 through the throttle member 28, the shifting device 9 and the conduit 14, the mass in the same being then forced out through the conduit 6 and the shifting device 3 up into the conduit 27. The vessel 89 having been emptied, the members 4 and 25 are shifted by means of the handle 103, the compressed air then entering the pressure vessel 88' through the conduit 13 and the mass therein being forced out through the conduit 7 and the switching device 3 to the conduit 27. The pressure vessel 89 is filled with mass, as before, whereupon the handle 103 is shifted anew. This shifting of the handle 103 need only be effected at comparatively long intervals, depending on the size of the pressure vessels 88' and 89.

A continuous flow of mass through the conduit 27 will thus take place, the pressure on the mass depending on the pressure of the gas which, in turn, may be controlled by a reduction valve or by the throttle member 28. The rotating drum 97 drives the disks 111 and 112 through the gear wheels 108 and 110, and thus drives the tooth 113 connected to the disk 112. The ratio of gear is such that the disks 111 and 112 make one revolution, while the peripheral portion of the drum 97 moves a distance somewhat greater than the length of a flake. When the tooth 113 engages the recesses of the member 106, a quick adjustment of this member is effected, the shaft 35 and the piston or the like 104 then turning in such a manner that the conduits 31 and 27 will be connected with each other for a moment through a port 105 in the said piston 104. A number of drops 34 will then be pressed forth through the spreading device 32 and the nozzles 33, the size of which drops depends partly on the outlet openings and partly on the pressure in the conduits 31 and 27, which pressure is controlled by the throttle member 28. By reason of the kinetic energy imparted to the drops 34 through the comparatively high velocity at which they are pressed forth through the nozzles on account of the pressure the drops leave the nozzles very easily and fall down on the drum 97 where they spread out and solidify. For each revolution of the disks 111 and 112 an adjustment of the member 106 is effected together with an adjustment of the piston 104, a series of drops then flowing forth. The disks 111 and 112 may also be provided with a plurality of recesses and teeth 113 respectively, a correspondingly lower ratio of gear being thus provided between the gear wheels 108 and 110.

The flakes spread out on the drum 97 solidify and dry, perhaps, during the rotation of the drum, whereupon they are finally scraped off by means of the knife or scraper 73 to be removed to the conveyor band 59, after which they are further dried and roasted, if desired, in elongated furnaces and/or roasting drums. The roasting may also be effected directly on the drum 97, the flakes being then scraped off in a later stage, so that the whole circumference of the drum is utilized. Obviously, the drum may also be replaced by a band, the shaft 107 being then connected with the shaft of one of the rollers over which the band is running. Any of the combinations of bands and rollers mentioned hereinbefore may also be used here, and the drum may be heated in any suitable manner by means of gas, hot liquids, steam or electricity.

The solidification of the flakes may also take place at temperatures up to 80 to 100 degrees, preferably 50 to 80 degrees centigrade. The drying is effected at temperatures between 80 and 160 degrees centigrade, preferably at 80 to 150 degrees centigrade, and the roasting is effected at temperatures above 140 degrees centigrade, preferably at 150 to 200 degrees centigrade. Evidently, the gases or the surfaces on which the solidification, the drying and the roasting processes take place may be considerably hotter, the time for solidification, drying and roasting respectively being thus reduced.

The arrangements described may obviously be varied in different ways without departing from the invention. In Fig. 1, for instance, the mixing machine may be of various forms of embodiment. The feeding device for the feeding of the liquid or plastic mass through the conduit 27 may be replaced by a rotating screw at a more solid consistency of the mass. The cut-off members 4 and 25 may be given other forms such as valves, cocks or the like, and may be built together into a unit, if desired. This is also the case with the cut-off members 30 and 36. The spreading device 32, for example, may also be made rotating, and the periodic interruption of the liquid mass penetrating through the conduit 27 as well as the forcing up of this mass may be effected directly with the aid of a motor. The heating of the heating plate 65 or the drum 97 as well as of the furnace 66 or the roasting drum 98 may also take place through other sources of heat, such as steam, electricity and so forth, besides which the said drums and furnaces may also be heated severally. The rotating drying drums, on which the drops fall down, may be replaced by a special band running over two rollers, which band is entirely separated from the other band.

According to the method, and with the aid of the arrangements described, various substances and special articles of food may be produced, through some variations, in the form of "spin". A very thin liquid dough of an arbitrary cereal, such as oat, is fed in known manner through the spreader 32 in the machinery according to Fig. 1, for instance. Here, the nozzles 33 are formed as fine apertures through which the mass of dough may penetrate as a coherent string. The spreader is provided with a number of nozzles situated close to one another and placed directly over the horizontally or nearly horizontally running band. During the time in which the mass of dough is ejected through the fine nozzles, the spreader performs a horizontal rotary movement at a suitable diameter of 5 to 6 or 15 to 20 millimeters, for example. During the time in which the mass is ejected and the rotary movement takes place, the band is stationary, so that the mass will be ejected onto the plate in the form of small spun loaves. If the mass consists substantially of an oat preparation, these loaves may be given the name "oat spin". As soon as the ejection of the mass of dough ceases by an adjustment of the shifting members 29 and 37, these shifting members may actuate a friction coupling or motor switch with the aid of a lever or the like, so that the band, which was hitherto stationary, is brought into movement and advanced by a distance just corresponding to the surface covered by the spun loaves. After that the shifting members 29 and 37 are again brought into operation, whereupon another set of loaves are ejected onto the plate which has now again been made stationary by means of the switching device. The ready-spun loaves are carried by the band, successively as before, into the furnace 66 wherein they are first dried and then roasted, whereupon they are delivered to the packeting means at the roller 63, through the conveyor drum 74 or by a conveyor band, if desired. As before, the drying of the "spin" may evidently be effected on a special movable band, the roasting being done on a second band or in a rotary roasting drum. The production of "spin" may also take place on drums.

All methods and means, for flakes as well as for "spin", may also be provided with a plurality of bands or drums running in parallel.

The magnitude of the pressure above atmospheric used for the ejection of the mass should be chosen with respect to the viscosity and may vary, according to the circumstances, between the limit values 1-20 atmospheres. In the manufacture of cereal flakes, for instance, a pressure above atmospheric of 5-10 atmospheres has been found suitable.

What I claim is:—

1. In a method of producing flakes, and the like from a plastic mass, the steps comprising feeding said mass through openings while imparting to the mass a great energy of movement intermittently and abruptly arresting the movement of the bulk of said mass so as to cause sub-division of the mass into units of predetermined size and cause the units thus formed to individually leave the openings by utilizing the momentum of said mass to project said units.

2. In a method of producing flakes, and the like from a plastic mass, the steps comprising pressing the mass through openings while imparting to same a great energy of movement intermittently and abruptly arresting the movement of the bulk of said mass so as to cause sub-division of the mass into units of predetermined size and cause the units thus formed to individually leave the openings by utilizing the momentum of said mass to project said units.

3. In a method of producing flakes, and the like from a plastic mass, the steps comprising feeding a stream of the mass through an opening under pressure and periodically cutting off the pressure to form units of predetermined size from the mass being fed and impart to said units such a great energy of movement as to cause them to individually leave said opening by utilizing the momentum attained by said units to project the same from the bulk of said mass when the movement of said mass is suddenly arrested.

4. In a method of producing flakes, and the like from a plastic mass, the steps comprising subjecting the mass to pressure, pressing the mass through openings while imparting to the mass a great energy of movement intermittently and abruptly arresting the movement of the bulk of said mass so as to cause units to be separated from the bulk of the mass and to leave the openings by utilizing the momentum attained by said units to project the same from the bulk of said mass when the movement of said mass is suddenly arrested.

5. A method of producing flakes, and the like from cerealia as main raw material, comprising intermittently feeding a plastic mass of the raw material under pressure through openings to form units thereof, imparting to said units such a great energy of movement as to cause them to leave said openings by utilizing the momentum attained by said units to project the same from the bulk of said mass when the movement of said mass is suddenly arrested, collecting the units thus formed on a movable surface, heating the units in a first stage to a temperature adapted for the solidification of the units, heating the solidified units in a second stage to a temperature adapted for drying the solidified units and heating the dried units in a third stage to a temperature adapted for roasting the dried units.

6. A method of producing flakes, and the like from cerealia as main raw material, comprising intermittently feeding a plastic mass of said raw material under pressure through openings to form units thereof while imparting to said units such a great energy of movement as to cause them to leave the openings by utilizing the momentum attained by said units to project the same from the bulk of said mass when the movement of said mass is suddenly arrested, heating the units thus formed in a first stage to a temperature of about 50 to 100° C. to effect solidification of the units, heating the solidified units in a second stage to a temperature of about 80 to 160° C. to effect drying of the solidified units and heating the dried units in a third stage to a temperature of above 140° C. to effect roasting of the dried units.

7. A method of producing flakes, and the like from cerealia, as main raw material, comprising intermittently feeding a plastic mass of said material under pressure through openings to form units thereof while imparting to the units such a great energy of movement as to cause them to leave the openings by utilizing the momentum attained by said units to project the same from the bulk of said mass when the movement of said mass is suddenly arrested, heating the units thus formed in a plurality of stages at increasing temperatures, and utilizing heat discharged from a stage of higher temperature to heat the units in a stage of lower temperature.

8. A method of producing flakes, and the like from cerealia as main raw material, comprising intermittently feeding a plastic mass of the raw material under pressure through openings to form units thereof while imparting to the units such a great energy of movement as to cause them effectively to leave the openings by utilizing the momentum attained by said units to project the same from the bulk of said mass when the movement of said mass is suddenly arrested, collecting the units on movable surfaces, heating the units on said surfaces by leading a heated gas in contact with said units.

9. A machine for the production of flakes, and the like from a plastic mass, comprising in combination means to divide said mass into units of predetermined size, means to feed said mass under pressure to said dividing means, means periodically to break said feeding pressure and cause said units to be projected by their attained momentum from said dividing means when the movement of the mass being fed to the dividing means is suddenly arrested, a heating means communicating with the outlet end of said dividing means and means in said heating means to feed the units through same.

10. In a machine for the production of flakes, and the like from a plastic mass, the combination with means to divide said material into units including means to feed said material under pressure to said dividing means and means periodically to break the feeding of the mass and cause said units to be projected by their attained momentum from said dividing means when the movement of the mass being fed to the dividing means is suddenly arrested, of heating means communicating with the outlet end of said dividing means and means in said heating means to feed the units therethrough.

11. In a machine for the production of flakes, and the like from cerealia as main raw material, a container for forming a plastic mass of the corealia together with additional ingredients, two vessels, a change over device alternatingly to connect one of said vessels with said container so as to transfer plastic mass from the container into the vessel connected thereto, a dividing device to form units from the plastic mass, means to put the vessel which is filled with plastic mass under pressure means to connect the vessel under pressure with the dividing device so as to transfer the mass thereto, said dividing device including means to impart to the units such a great energy of movement as to cause them to leave the dividing device by utilizing the momentum attained by said units to project the latter from the dividing means when the movement of the mass being fed to said dividing means is suddenly arrested.

12. A method of producing flakes, and the like from cerealia as main raw material, comprising intermittently feeding a plastic mass of the raw material under pressure through openings to form units thereof, imparting to said units such a great energy of movement as to cause them to leave said openings by utilizing the momentum attained by said units to project the same from the bulk of said mass when the movement of said mass is suddenly arrested, collecting the units thus formed on a movable surface, and heating the collected units to a temperature adapted for solidifying said units.

13. A method of producing flakes, and the like from cerealia as main raw material, comprising intermittently feeding a plastic mass of the raw material under pressure through openings to form units thereof, imparting to said units such a great energy of movement as to cause them to leave said openings by utilizing the momentum attained by said units to project the same from the bulk of said mass when the movement of said mass is suddenly arrested collecting the units thus formed on a movable surface, heating the collected units in a first stage to a temperature adapted for solidifying said units, and further heating the solidified units in another stage to a temperature adapted at least for drying the same.

AXEL UNO SÄRNMARK.